US00RE42498E

(19) United States
(12) Reissued Patent
Tang et al.

(10) Patent Number: US RE42,498 E
(45) Date of Reissued Patent: Jun. 28, 2011

(54) WIDE IMAGE SCANNER

(75) Inventors: Ming-Chung Tang, Taoyuan County (TW); John Lin, Hsinchu County (TW)

(73) Assignee: Transpacific Opties LLC, Wilmington, DE (US)

(21) Appl. No.: 11/256,619

(22) Filed: Oct. 21, 2005

Related U.S. Patent Documents

Reissue of:
(64) Patent No.: 6,636,335
Issued: Oct. 21, 2003
Appl. No.: 09/338,224
Filed: Jun. 22, 1999

(51) Int. Cl.
*H04N 1/04* (2006.01)

(52) U.S. Cl. ..... 358/496; 358/488; 358/498; 358/474; 358/449; 358/487

(58) Field of Classification Search ..... 358/496, 358/488, 498, 474, 449, 487
See application file for complete search history.

(56) References Cited

U.S. PATENT DOCUMENTS 4,621,801 A * 11/1986 Sanchez ..... 271/251
4,864,415 A * 9/1989 Beikirch et al. ..... 358/447
5,267,059 A * 11/1993 Kawabata et al. ..... 358/474
5,517,332 A * 5/1996 Barry et al. ..... 358/474
5,629,529 A * 5/1997 Motoyama ..... 250/559.24
5,847,948 A * 12/1998 Gatto et al. ..... 363/65
6,075,623 A * 6/2000 Yun ..... 358/486
6,108,456 A * 8/2000 Yamamoto ..... 382/270
6,133,564 A * 10/2000 Kim ..... 250/234
6,384,941 B1 * 5/2002 Ryu ..... 358/474

* cited by examiner

*Primary Examiner*—Houshang Safaipour
(74) *Attorney, Agent, or Firm*—Perkins Coie LLP

(57) ABSTRACT

A wide image scanner which can scan the image of a large scale original using only a regular image sensor is provided. The invention includes a sliding shaft, an image reading device, a number of paper width sensors, a paper edge sensor, and a control module. Whenever the paper edge sensor detects the presence of an end edge of the original, it will send a vertical control signal to the control module to control the rotation direction of the rollers. On the other hand, the paper width sensors detect the width of the original and send the horizontal control signals to the control module. From the horizontal control signals, the control module can determine the number of horizontal displacement positions and control the horizontal displacement each time for the image reading device after the paper edge sensor detects the end edge of the original. The procedure continues until the image reading device has been moved to the final displacement position predetermined by the horizontal control signal. Consequently, the entire image of the origin can automatically be read portion by portion without manual operation.

23 Claims, 3 Drawing Sheets

WIDE IMAGE SCANNER

Matter enclosed in heavy brackets [ ] appears in the original patent but forms no part of this reissue specification; matter printed in italics indicates the additions made by reissue.

BACKGROUND OF THE INVENTION

A. Field of the Invention

The present invention is an image information reading device, especially to a wide image scanner which can scan the image of a large scale original using only an image sensor of a regular size.

B. Description of the Prior Art

A conventional scanner is designed for the most commonly used size of documents, such as A4, A3, B4, or even B3 sizes. The width of an image reading device, such as a Charge Coupled Device (CCD) or a Contact Image Sensor (CIS), is also designed wide enough to finish reading the image of the regular-sized original in a single pass. For scanning large scale sheets, such as posters or newspapers, the user would have to manually operate the scanner to scan the original portion by portion. Then, after the image of the entire original has been scanned, the user has to merge corresponding portions together by an application software. Such procedure is very tedious and time consuming. On the other hand, if the user would like to scan the large-scaled original in a single pass, the width of the image reading device must be wide enough to cover the width of the original. However, since such wide image reading device is very expensive, the implementation cost for the entire scanner will be very high.

SUMMARY OF THE INVENTION

Accordingly, it is an object of the present invention to provide a wide image scanner which can read a large scale original using a regular-sized image reading device, thereby to reduce the implementation cost.

It is another object of the present invention to provide a structure and mechanism for a wide image scanner which can automatically determine the number of passes for scanning the entire image of the original portion by portion without human operation.

In accordance with the present invention, the preferred embodiment of the present invention preferably includes a sliding shaft, an image reading device, a number of width sensors, a paper edge sensor, and a control module. On one side of the housing, there is a paper feeding opening for inputting an original. Inside the housing and close to the paper feeding opening, there is a set of rollers cooperating to form a nip so as to allow the original to pass therebetween. On the opposite side of the housing, there is a paper output opening for the original to output. Inside the housing and close to the paper output opening, there is the other set of rollers cooperating to form a nip for the original to pass through. A transparent sheet supporting plate is disposed on the same horizontal plane of the nips of the rollers to support the sheet while the sheet is driven back and forth by the two sets of rollers. An image reading device is mounted on a sliding shaft and below the transparent sheet supporting plate for reading the image of the original line by line.

At one side of the housing, there is a paper edge sensor for detecting the end edge of the origin. When detecting the end edge of the origin, the paper edge sensor generates a vertical control signal to a control module. Upon receiving the vertical control signal, the control module will enable the two sets of rollers to rotate in an opposite direction. While the origin is fed into the housing, the paper width sensors located on the inner top of the housing detect the side edge of the original and generate horizontal control signals to the control module. Upon receiving the horizontal control signals, the control module will set the number of horizontal displacement times and then enable the driving device to move the image reading device to a next displacement position every time when the origin is driven to an end. The procedure continues until the image reading device has been moved to a final displacement position predetermined by the horizontal control signal. Consequently, the entire image of the origin can automatically be read portion by portion without manual operation.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 1:
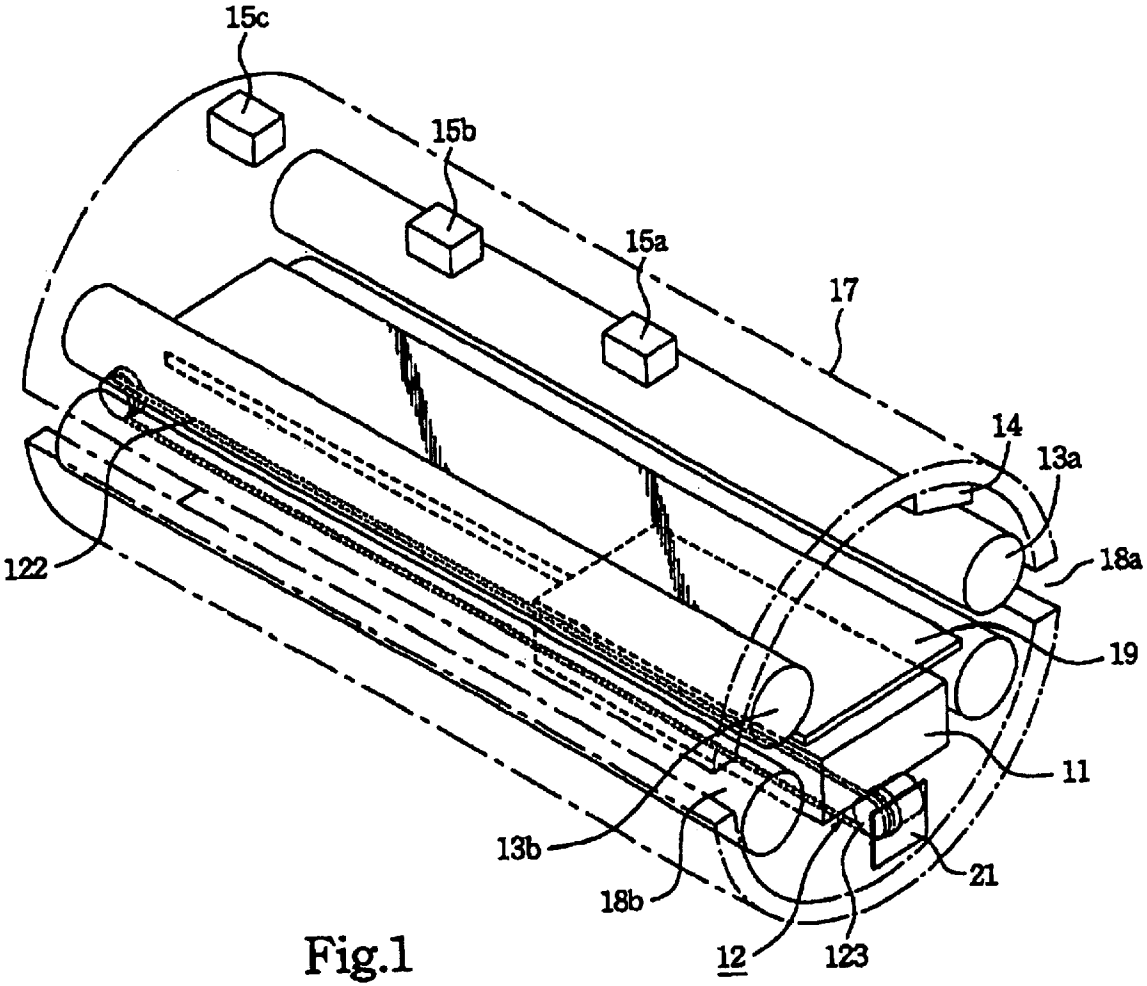
FIG. 1 is a perspective view showing the structure of the preferred embodiment of the present invention.
Figure 2:
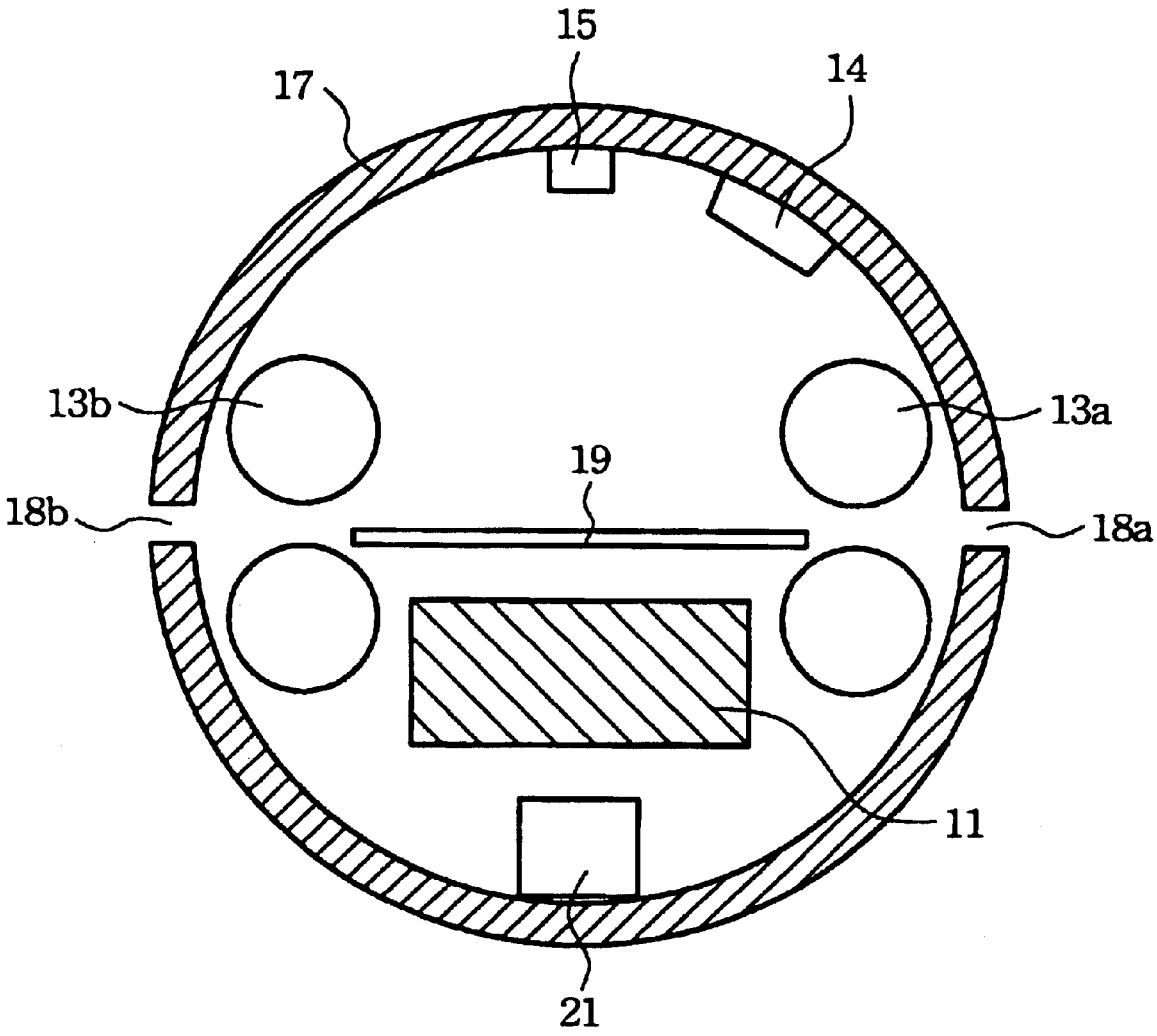
FIG. 2 is a side view showing the structure of the preferred embodiment of the present invention.

The preferred embodiment of the present invention is illustrated in FIG. 1. It comprises an image reading device 11, a driving device 12, two sets of roller pairs 13a, 13b, a paper edge sensor 14, a transparent sheet supporting plate 19, and multiple paper width sensors 15a, 15b, 15c. The relative positions of these elements can be shown more clearly by referring to FIG. 2.

The housing 17 is in a shape of cylindrical. On one side of the housing 17, there is a paper feeding opening 18a. On the opposite side of the housing 17, there is a paper output opening 18b. Inside the housing 17, there is a roller pair 13a close to the paper feeding opening 18a, and a roller pair 13b close to the paper output opening 18b respectively. Each roller pair 13, 13b cooperating to form a nip for an original to pass through. The roller pairs 13, 13b also determine the direction of the vertical movement of the original.

On one side of the housing 17, there is a paper edge sensor 14 for detecting the front edge or the end edge of the original and generating a vertical control signal to the control module 21 upon the presence of the edge of the original. Upon receiving the vertical control signal, the control module 21 will enable the two sets of roller pairs 13a, 13b to rotate in a first direction for driving the original progressively from one end to the opposite end. The image reading device 11 will read the image of the origin line by line while the origin is passing through the transparent sheet support plate 19. The image reading device 11 can be a regular sized contact type image sensor or a charged coupled device.

The transparent sheet support plate 19 is made of comparable material such as glass or acrylic. Since the transparent sheet support plate 19 is on the same horizontal plane of the nips of the rollers 13a, 13b, it functions as a guiding device to guide the origin from an opening to the other opening.

The image reading device 11 can be driven horizontally by the driving device 12. The driving device comprises a sliding shaft (not shown), a conveying element 122, such as a timing belt or a steel string, and a motor 123. The motor

123 is then driven by the control module 21. The image reading device 11 is mounted on the sliding shaft and controllable by the conveying element 122 to move reciprocally on the sliding shaft in response to the control of the control module 21.

The control module 21 is an electric circuit for controlling the entire driving mechanism of the scanner. The control module 21 can predetermine the displacement positions for image reading device 11. The displacement positions refer to the location for the image reading device 11 to start reading a portion of the large scale origin. In other words, the displacement positions indicates the positions for merging two corresponding images. The distance between two displacement positions will be less or equal to the width of the image reading device 11. Consequently, the entire image of the original can be efficiently merged.

On top of the transparent plate 19 and corresponding to each displacement position, there are multiple width sensors 15a, 15b, 15c for detecting the width of the original, and generating a horizontal control signal to the control module 21. Each of the multiple width sensors 15a, 15b, 15c can detect an object as the light emitted by the sensors is blocked by an object. Accordingly, if the width of the original is twice than the width of the image reading device 11, then two multiple width sensors will detect the origin and send the horizontal control signals to the control module 21. From the horizontal control signals received, the control module 21 will determine the number of displacement times for moving the image reading device 11. In this case, the displacement times will be set to 1.

Figure 3:
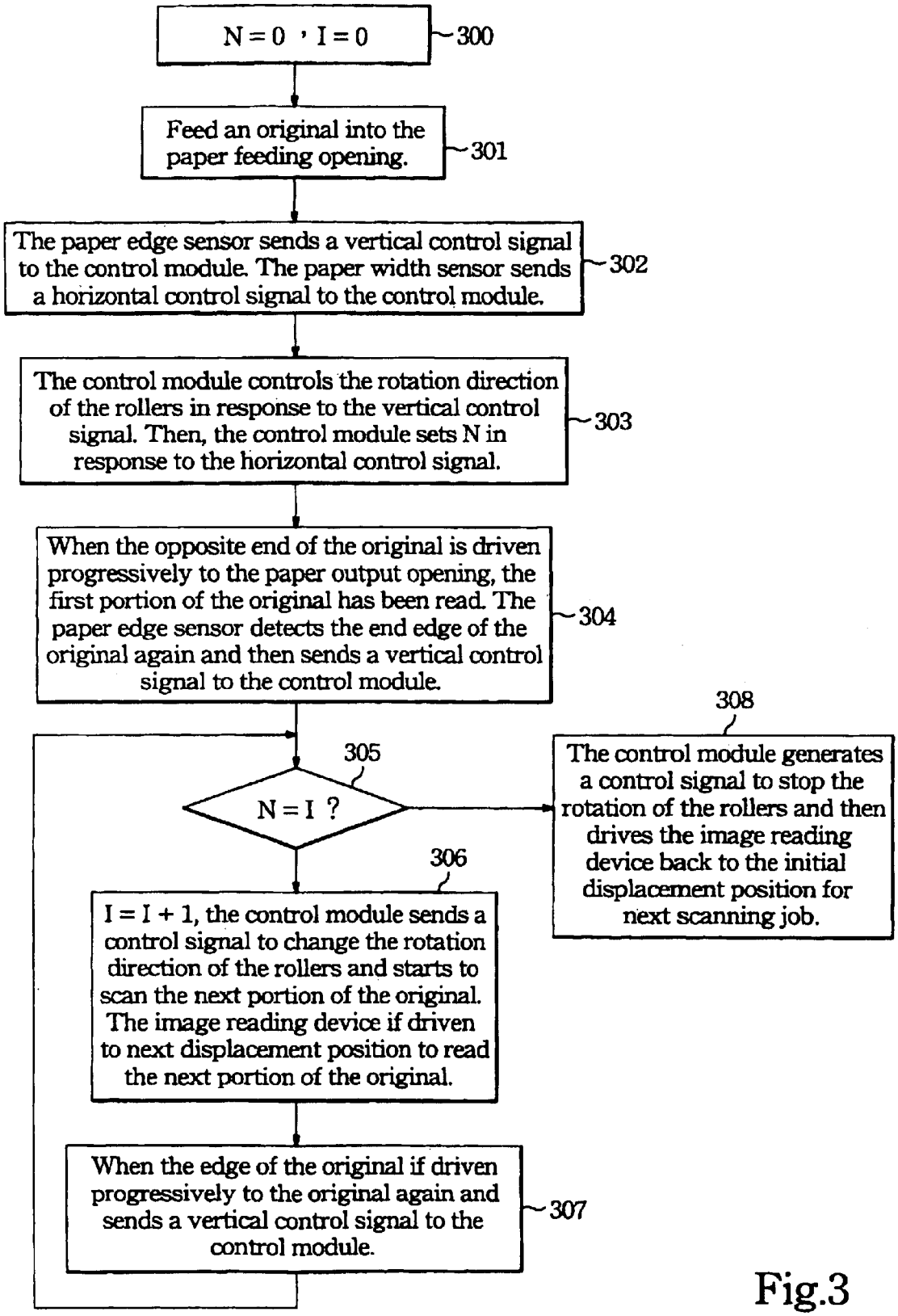
FIG. 3 is a flowchart showing the operations of the preferred embodiment of the present invention.

The operations of the preferred embodiment is illustrated in FIG. 3. Refer to FIG. 3:

300: Set a predetermined number of horizontal displacement positions N=0, the number of displacement times I=0.

301: Feeding an original into the paper feeding opening.

302: Paper edge sensor detects the front edge of the paper and then sends a vertical control signal to the control module. At the same time, the paper width sensor detects the side edge of the original and sends a horizontal control signal to the control module.

303: The control module control the rotation direction of the two sets of rollers in response to the vertical control signal. Then, the control module set horizontal displacement positions N for the image reading device in response to the horizontal control signal.

304: When the original is driven progressively to the paper output opening, the first portion of the original has been finished reading. The paper edge sensor detects the end edge of the original and then sends a vertical control signal to the control module.

305: Control module determines if the horizontal displacement positions are equal to the number of displacement times, N=I? If yes, go to step 308; If not, go to step 306.

306: I=I+1, the control module sends a control signal to change the rotation direction of the rollers and start to scan the second portion of the original. At the same time, the driving device moves the image reading device to next displacement position. Then, the image reading device will start to read the next portion of the original.

307: When the edge of the original is driven progressively to the paper output opening, the paper edge sensor detects the edge of the original, so it sends a vertical control signal to the control module. Go to step 305.

308: Since the number of displacement times I is equal to the horizontal displacement positions N, so the control module generates a control signal to stop the rotation of the rollers and then return to the initial displacement position for next scanning job.

To sum up, the present invention provides a wide image scanner with a structure which can automatically determine the number of times for horizontal displacement, thereby to scan the entire image of the original portion by portion. The wide image scanner of the present invention is operated completely automatically and without human operations. Moreover, the present invention uses a regular sized image reading device so the manufacturing cost for the scanner can be reduced.

A preferred embodiment has been described in detail hereinablove. It is to be understand that he scope of the invention also comprehends embodiments different from the one described, yet within the scope of the claims. For example, the transparent sheet support plate could be made of other comparable materials. Also, the housing could be of shapes other than cylindrical, such as rectangular, as long as it provides openings for the input and output of the original. And the number of paper width sensors is not limited to three as described in FIG. 1. It should be understood that various alternatives to the structures described herein may be employed in practicing the present invention. It is intended that the following claims define the invention and that the structure within the scope of these claims and their equivalents be covered thereby.

What is claimed is:

1. A wide image scanner, comprising:

a housing having a paper feeding opening and a paper output opening;

a first set of rollers disposed close to said paper feeding opening and cooperating to form a nip for an original to pass therebetween;

a second set of rollers disposed close to said paper output opening and cooperating to form a nip for said original to pass therebetween;

an image reading device for reading the image [if] *of* said original;

driving means for driving said image reading in *a* horizontal direction, comprising:

a sliding shaft, wherein said image reading device is mounted on said sliding shaft;

a conveying element, wherein said image reading device is controllable by said conveying element to move reciprocally on said sliding shaft; and a motor;

a paper edge sensor disposed at one side of said housing for detecting the end edge of said original and generating a vertical control signal in response to the presence of the end edge of said original;

a plurality of paper width sensors fixed at the inner top of said housing and each located corresponding to a plurality of predetermined displacement positions for detecting [the] *a* width of said original and generating a horizontal control signal in response to the presence of the side edge of said original; and control means for controlling the rotation directions of said first set of rollers and said second set of rollers in response to said vertical control signal, and for controlling said driving means and driving said motor to move said image reading device to one of said predetermined displacement positions in response to said horizontal control signal.

2. The wide image scanner as claimed in claim 1, further comprising:

transparent paper support means disposed above said image reading device for supporting said original.

3. The wide image scanner as claimed in claim 1, wherein said image reading device is a contact type image sensor.

4. The wide image scanner as claimed in claim 1, wherein said image reading device is a charge coupled device.

[5. The wide image scanner as claimed in claim 1, wherein said driving means comprising:

a motor; and a conveying element for reciprocally driving said image reading device in horizontal direction.]

6. The wide image scanner as claimed in claim 1, wherein said control means is a control circuit.

7. The wide image scanner as claimed in claim 1, wherein each of said predetermined displacement positions determines a horizontal position for merging images *of said original*.

*8. An apparatus, comprising:*

*a first set of rollers and a second set of rollers;*

*an image reading device configured to read one or more images of a document, wherein said first and second set of rollers are configured to move said document proximate to said image reading device;*

*a driving device configured to drive said image reading device in a first direction;*

*an edge sensor configured to generate a second direction control signal, wherein the second direction is generally transverse to the first direction;*

*a plurality of width sensors corresponding to a plurality of predetermined displacement positions, wherein one or more of said width sensors is configured to detect a width of said document and generate a first direction control signal; and*

*a control module configured to control rotation directions of said first set of rollers and said second set of rollers in response to said second direction control signal, and wherein the control module is configured to control said driving device to move said image reading device to one of said predetermined displacement positions in response to said first direction control signal.*

*9. A method, comprising:*

*moving a document in a first direction proximate to an image reading device using a first and a second set of rollers;*

*driving said image reading device in a second direction using a driving device, wherein the second direction is generally transverse to the first direction;*

*sensing an edge of said document;*

*generating a first direction control signal in response to the sensed edge of said document;*

*detecting a width of said document;*

*generating a second direction control signal in response to the detected width of said document;*

*moving the document in response to said first direction control signal; and*

*moving said image reading device in response to said second direction control signal.*

*10. The apparatus of claim 8 wherein the driving device includes a conveying element operably coupled to a sliding shaft and a motor, wherein said image reading device is mounted on said sliding shaft and controllable by said conveying element.*

*11. The apparatus of claim 8, further comprising a transparent support plate positioned proximate to the image reading device, wherein said transparent support plate supports the document.*

*12. The apparatus of claim 8 wherein the image reading device includes at least one of a contact image sensor (CIS) and a charge coupled device (CCD).*

*13. The apparatus of claim 8, further comprising a housing at least partially surrounding the first and second set of rollers, wherein the housing includes an input opening and an output opening.*

*14. The apparatus of claim 8 wherein each of the predetermined displacement positions determines a position in the first direction for merging the one or more read images of said document.*

*15. The method of claim 9 wherein driving said image reading device includes mounting said image reading device on a sliding shaft and controlling motion of the image reading device along the shaft with a conveying element.*

*16. The method of claim 9 wherein detecting the width of the document includes detecting the width using a plurality of sensors positioned at predetermined displacement positions.*

*17. The method of claim 9 wherein moving the document includes controlling rotation directions of said first set of rollers and said second set of rollers in response to said second direction control signal.*

*18. The method of claim 9 wherein moving said image reading device includes moving said image reading device to one or more predetermined displacement positions in response to said first direction control signal.*

*19. The method of claim 9, further comprising receiving the document through an input opening in a housing at least partially surrounding the first and second sets of rollers, and outputting the document through an output opening in the housing.*

*20. The method of claim 9, further comprising:*

*reading a first image and a second image from the document with the image reading device; and*

*merging the first and second images.*

*21. An apparatus, comprising:*

*a first set of rollers and a second set of rollers configured to move a document proximate to an image reading device;*

*means for detecting a width of said document, wherein the means for detecting the width correspond to a plurality of predetermined displacement positions;*

*means for moving the image reading device in a first direction in response to the detected width;*

*means for sensing an edge portion of said document; and*

*means for controlling the first and second rollers to move the document in a second direction in response to the sensed edge portion, wherein the second direction is generally transverse to the first direction.*

*22. The apparatus of claim 21 wherein the detecting means includes a plurality of sensors located at corresponding predetermined displacement positions, and wherein the plurality of sensors are configured to detect a side edge portion of the document.*

*23. The apparatus of claim 21 wherein the moving means includes a driving device having a conveying element operably coupled to a sliding shaft and a motor, and wherein said image reading device is mounted on said sliding shaft and controllable by said conveying element.*

*24. The apparatus of claim 21 wherein the sensing means includes an edge sensor positioned proximate to the first set of rollers.*

* * * * *